April 23, 1968 H. NERWIN 3,379,605

PHOTOGRAPHIC FILM REEL ARRANGEMENT

Filed June 24, 1964

HUBERT NERWIN
INVENTOR.

BY R. Frank Smith
David P. Ogden
ATTORNEYS

United States Patent Office 3,379,605
Patented Apr. 23, 1968

3,379,605
PHOTOGRAPHIC FILM REEL ARRANGEMENT
Hubert Nerwin, Rochester, N.Y., assignor to Eastman
 Kodak Company, Rochester, N.Y., a corporation of
 New Jersey
Filed June 24, 1964, Ser. No. 377,587
3 Claims. (Cl. 161—126)

ABSTRACT OF THE DISCLOSURE

A film leader having slanted fluting disposed along the edges so that engagement of one layer of the deformed leader with the next adjacent layer of deformed leader causes lateral displacement therebetween to prevent edge fog of the enclosed film.

---

The present invention relates to a photographic reel arrangement and more particularly to an arrangement for controlling edge fog or roll film which does not have any backing paper.

In the art of photographic film packaging, one of the problems which has been of major importance is avoiding fogging exposure of the undeveloped film when it is on a reel which may be handled in an illuminated environment as during loading of a camera. One practical solution to this problem has been to provide a backing paper wherein the edges of the paper are feathered so that they tightly engage the flanges of the reel. However, when using relatively long filmstrips on reels, such as in motion pictures, it is not practicable to attempt to use backing paper because of the convolution growth problems as well as because of the increase in mass with such an amount of backing paper. Various techniques for avoiding fogging damage of a filmstrip have been utilized in the past including providing a filmstrip with sprocket holes at both edges whereby a limited amount of edge fog is not particularly destructive of the useful portion of the filmstrip. Also, by having close tolerance control during production of the reels and the filmstrip, minimum amounts of light are able to reach the edges of the filmstrip. However, in attempting to utilize a greater portion of film area, without backing paper protection, as by making smaller sprocket holes or by providing sprocket holes on only one edge of the filmstrip, present techniques do not provide as great a margin of safety from edge fogging exposure as might be desired.

Therefore, an object of the present invention is to provide a simple and reliable arrangement for reducing the probability of edge fog on rolled filmstrip.

In accordance with one embodiment of my invention, the leading and trailing ends of the filmstrip are provided with structural configurations that tend to shift laterally adjacent convolutions of the film, thus tending to close any clearance gap that might exist between the coiled filmstrip and the flanges of the support spool.

The subject matter which is regarded as my invention is particularly pointed out and distinctly claimed in the concluding portion of this specification. The invention, however, as to its organization and operation together with further objects and advantages thereof, will best be understood by reference to the following description taken in connection with the accompanying drawing in which:

Figure 6:
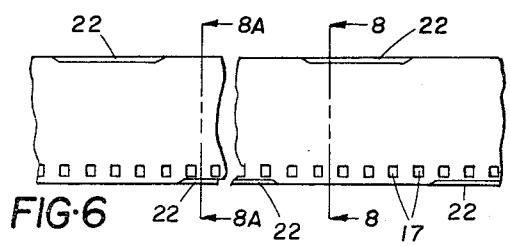
Figure 7:
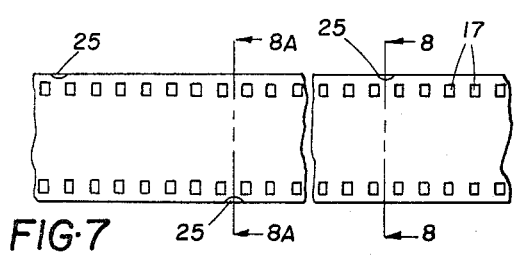
Figure 8:
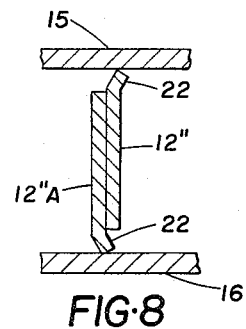

FIGS. 6 and 7 illustrate two other embodiments of my invention wherein the edges of the film have deformed cross sections; and FIG. 8 illustrates overlapping layers in cross section taken along lines 8—8 and 8A—8A of FIGS. 6 and 7.

Figure 1:
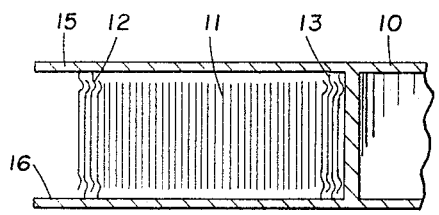
FIG. 1 is a cross section view of a reel wound with a filmstrip incorporating my invention.

Referring now to the drawing, in which like numerals indicate similar parts, I have shown in FIG. 1 a film supply reel 10 having wound thereon a filmstrip 11 with the central length of the filmstrip 11 being substantially flat laterally, as is normal to such filmstrips. A leading or leader portion 12 of the filmstrip 11 and a trailing portion 13 (which will, on rewind, be a leader portion) are of a deformed cross section, being fluted in a slanting manner at least on one edge so that overlapping fluted portions result in some of the layers engaging an upper flange 15 of the reel 10 and others engaging a lower flange 16.

Figure 2:
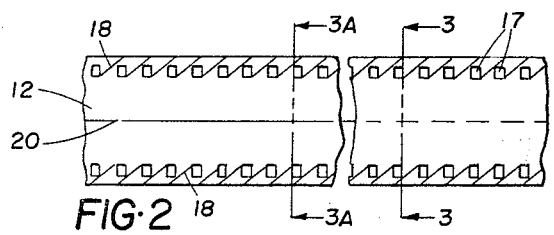
FIG. 2 is a top plan view of a portion of a leader section of the filmstrip of FIG. 1.

As will become apparent from the following description, the skewing forces resulting from the overlapping of the slanted fluting areas may be developed by use of several equivalent, but dissimilar, deformations. As illustrated in FIG. 2, the deformations are placed at both edges of the film in the area of the sprocket holes 17. The deformations are canted fluting (placed at a slant) indicated by the shadow marks 18 rather than in a longitudinal or lateral pattern which would not tend to displace one layer laterally relative to adjacent layers. The fluting is accomplished only in the leader or trailing portion of the film as indicated at 12 in FIG. 2. Otherwise, the overall thickness of the coiled filmstrip would be increased an objectionable amount.

Figure 3:
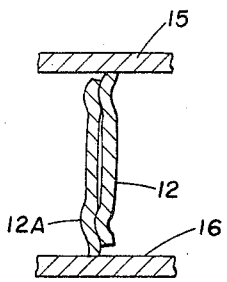
FIG. 3 illustrates a pair of overlapping cross section layers taken along lines 3—3 and 3A—3A of FIG. 2.

As indicated in FIG. 3, because of convolution growth of the overlapping layers of the film, the concentric layers will not align laterally with one another exactly whereby an inner layer 12 will contact the upper flange 15 and a next outer layer 12A will contact the lower flange 16. The cross section of these particular layers as illustrated in FIG. 3 is taken at the cross section lines 3—3 and 3A—3A of FIG. 2. Although no two adjacent layers may be displaced by the fluting to contact an opposite flange respectively throughout their entire circumfernce, they will tend to be displaced somewhat so that the cumulative affect is to provide an effective light seal by use of several layers as indicated in FIG. 1. However, fluting as shown in FIGS. 2 and 3 is not the only configuration which will develop a tendancy of overlapping layers to be shifted respectively rather than exactly overlapping.

Figure 4:
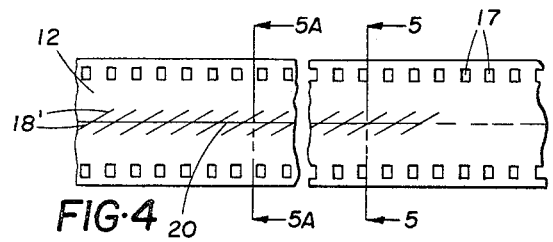
FIG. 4 shows another filmstrip plan view illustrating another embodiment of my invention.
Figure 5:
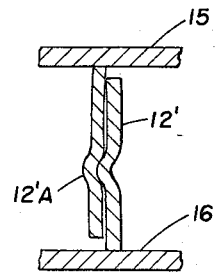
FIG. 5 illustrates a pair of overlapping cross section layers taken along the lines 5—5 and 5A—5A of FIG. 4.

More specifically, in FIG. 4 the fluting, as indicated by shadow marks 18′, is placed in the center of the 16 mm. filmstrip rather than at the edges. The overlapping offset of the filmstrip of FIG. 4 is illustrated in cross section in FIG. 5 as leader strip layers 12′ and 12′A. As illustrated in FIGS. 2 and 4, the fluting is balanced rather than all at one edge so that the one edge does not tend to be larger by convolution growth than the other. The placing of such fluting on only one edge would tend to displace the leader portion more in one direction than another.

Many 16 mm. filmstrips are later divided as indicated along the slit line 20 of FIGS. 2 and 4 into 8 mm. filmstrips so that the developed film is only 8 mm. wide with sprocket holes on only one edge. However, a light seal of developed films is of little concern to the present invention.

Referring now to FIGS. 6, 7 and 8, the edges of the filmstrip are bent slightly in longitudinally spaced apart section 22 as shown in FIG. 6 or in small longitudinally spaced apart sections 25 as shown in FIG. 7. These bent portions 22 and 25 tend to reside in a nonaligned manner as illustrated at layers 12″ and 12″A in FIG. 8. Thus, the consecutive layers are above and below the flat portions respectively so that some of those at the top will engage the upper flange 15 and some at the bottom will engage a lower flange 16. FIG. 6 is a representation of a "straight" 8 mm. film wherein only one side is provided with sprocket holes 17. Obviously, other film sizes other than 8 mm. and 16 mm. may take advantage of my invention.

While I have shown and described particular embodiments of the present invention, other modifications may occur to those skilled in this art. I intend, therefore, to have the appended claims cover all modifications which fall within the true spirit and scope of my invention.

I claim:

1. A film leader having a plurality of deformations in the surface thereof, said deformations extending through said leader substantially transversely thereof such that when the leader is wound engagement of one layer of deformed leader with a next adjacent layer of deformed leader causes lateral displacement therebetween.

2. The invention according to claim 1 wherein said deformations are disposed in at least one edge of said film leader.

3. The invention according to claim 1 wherein said deformations are in the form of slanted fluting disposed at an acute angle with the centerline of said film leader.

References Cited

UNITED STATES PATENTS

| 1,690,739 | 11/1928 | Lowkrantz | 96—78 |
| 2,105,238 | 1/1938 | Wittel | 96—78 |
| 2,391,269 | 12/1945 | Philips | 96—78 |

NORMAN G. TORCHIN, *Primary Examiner.*

J. RAUBITSCHEK, R. E. MARTIN,
*Assistant Examiners.*